United States Patent
O'Donnell

(10) Patent No.: US 8,112,779 B2
(45) Date of Patent: Feb. 7, 2012

(54) AUTOMATIC REPORTING OF ANTENNA INSTALLATION

(75) Inventor: Laura J. O'Donnell, El Segundo, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1006 days.

(21) Appl. No.: 10/827,809

(22) Filed: Apr. 20, 2004

(65) Prior Publication Data

US 2005/0235325 A1    Oct. 20, 2005

(51) Int. Cl.
*H04N 7/20* (2006.01)
(52) U.S. Cl. ........................................................ 725/72
(58) Field of Classification Search .............. 725/64–72, 725/107; 455/3.05, 63.4, 67.7, 67.13, 67.14, 455/12.1, 13.3, 24, 25, 3.02, 62, 161.3, 241, 455/252, 277.2, 423, 435.1, 435.2, 453, 457
See application file for complete search history.

(56) References Cited

U.S. PATENT DOCUMENTS

| | | | | |
|---|---|---|---|---|
| 4,558,358 A * | 12/1985 | Onda | ............................ | 725/107 |
| 4,907,003 A * | 3/1990 | Marshall et al. | ............... | 342/352 |
| 5,077,560 A * | 12/1991 | Horton et al. | .................. | 342/359 |
| 5,463,401 A * | 10/1995 | Iwasaki | ......................... | 342/359 |
| 5,471,219 A * | 11/1995 | Rodeffer et al. | .............. | 342/359 |
| 5,579,367 A * | 11/1996 | Raymond et al. | ............ | 455/418 |
| 5,771,015 A * | 6/1998 | Kirtman et al. | ................ | 342/359 |
| 5,797,083 A * | 8/1998 | Anderson | ........................ | 455/25 |
| 5,903,237 A * | 5/1999 | Crosby et al. | .................. | 342/359 |
| 5,955,988 A | 9/1999 | Blonstein et al. | | |
| 5,983,071 A | 11/1999 | Gagnon et al. | | |
| 6,075,997 A * | 6/2000 | Lindqvist et al. | .............. | 455/561 |
| 6,107,958 A * | 8/2000 | Kelkar et al. | ................... | 342/169 |
| 6,233,463 B1 * | 5/2001 | Wiedeman et al. | ......... | 455/552.1 |
| 6,337,658 B1 * | 1/2002 | Tong et al. | ...................... | 342/359 |
| 7,373,152 B2 * | 5/2008 | Oesterling | ................. | 455/456.1 |
| 2002/0066103 A1 * | 5/2002 | Gagnon et al. | ................... | 725/60 |
| 2003/0023978 A1 * | 1/2003 | Bajgrowicz | ...................... | 725/68 |
| 2003/0028891 A1 * | 2/2003 | Hardt et al. | .................... | 725/107 |
| 2003/0050015 A1 * | 3/2003 | Kelly et al. | ................... | 455/67.4 |
| 2004/0016002 A1 * | 1/2004 | Handelman et al. | ........... | 725/152 |
| 2005/0183130 A1 * | 8/2005 | Sadja et al. | ..................... | 725/107 |

FOREIGN PATENT DOCUMENTS

EP    579407 A1 *    1/1994
EP    668625 A1 *    8/1995

OTHER PUBLICATIONS

D. Eglise et al., "The UK DBS Receiver—The Requirements", Sep. 1988, Broadcasting Convention, 1988. IBC 1988., International, p. 196-199.*
Haller, N., "Antennas for direct to home reception of DBS television", Sep. 1990, Broadcasting Convention, 1990. IBC 1990., International, p. 151-58.*
Eglise, D, "The UK DBS Receiver—the Requirements", Sep. 1988, Broadcasting Convention, 1988, IBC 1988, pp. 196-199.*

* cited by examiner

*Primary Examiner* — Andrew Koenig
*Assistant Examiner* — Alfonso Castro

(57) ABSTRACT

A method for validating antenna installation to a broadcast provider to ensure proper alignment of the antenna with the broadcast provider's satellite system. The feedback provided by the customer, the installer, and signal strength and quality information communicated from the receiver to the broadcast provider are used to confirm proper installation. Upon confirmation of proper installation, the data can be used to troubleshoot equipment, or issue payment to the installer.

18 Claims, 1 Drawing Sheet

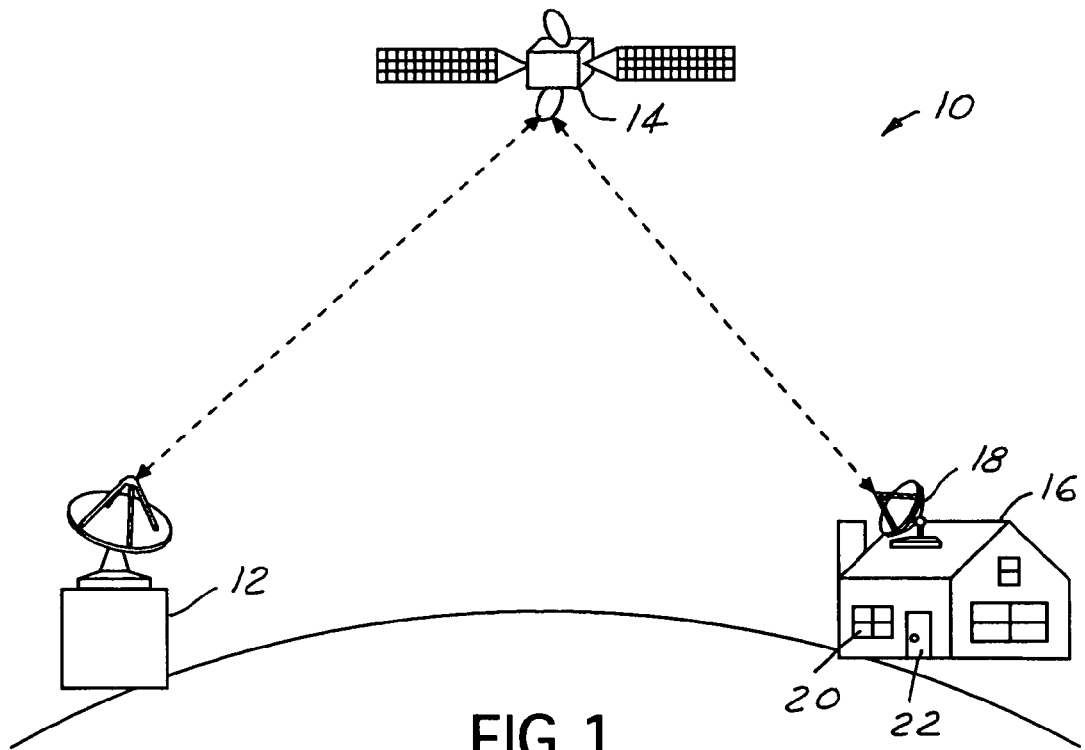
FIG. 1
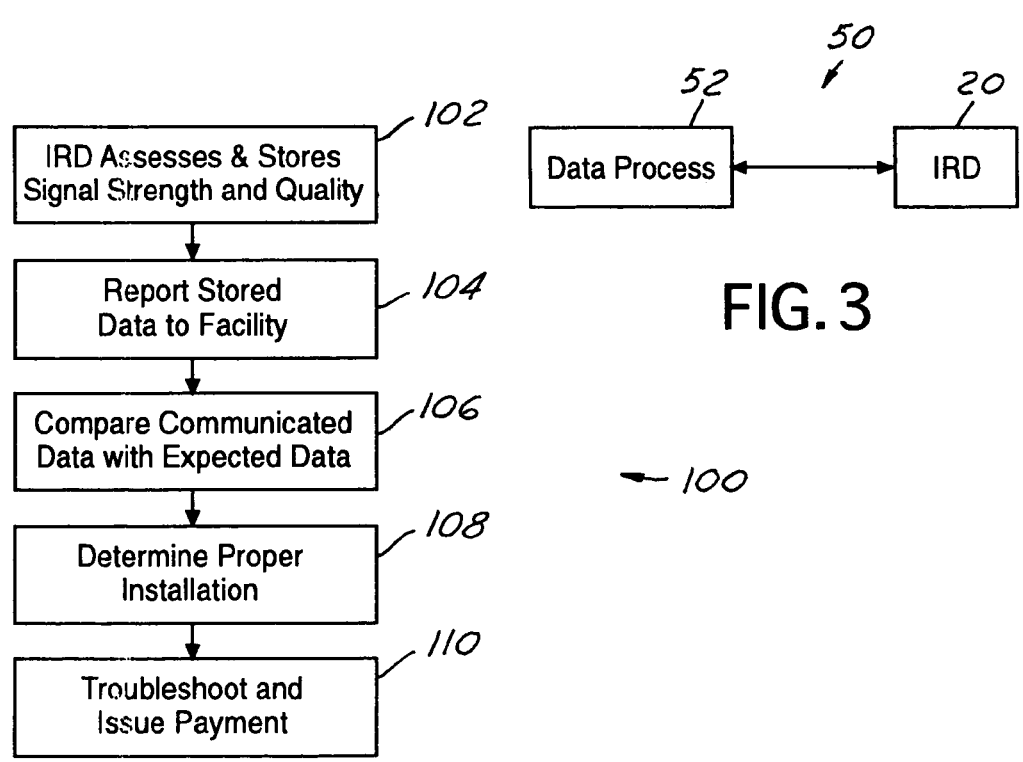
FIG. 3
FIG. 2

AUTOMATIC REPORTING OF ANTENNA INSTALLATION

TECHNICAL FIELD

The present invention relates generally to digital satellite communication systems, and more particularly to a method for reporting installation of a satellite receiver antenna at a customer site.

BACKGROUND OF THE INVENTION

In modern digital satellite communication systems, a ground-based transmitter beams an uplink signal to a satellite positioned in a geosynchronous orbit. The satellite in turn relays the signal back to a ground-based receiver antenna installed at a customer site, such as a household or office.

Direct broadcast Satellite (DBS) systems allow households to receive digital television, audio, data, and video directly from a geosynchronous satellite. Each household subscribing to the system receives the digital broadcast signals on a satellite dish. The typical DBS home receiver includes an outdoor satellite antenna, usually configured as an eighteen inch diameter parabolic dish, and a television set-top decoder module, or an IRD. Cables link the antenna to the IRD and television. Wiring, switches and other distribution components are also included.

Customers, or subscribers, can install satellite receivers without professional assistance. However, more often, an installer is used to mount the satellite dish in a direct line of sight with the broadcast satellite. Once the dish is mounted, it should not need adjustment.

Once the dish is installed, fine tuning of the alignment is performed by using an on-screen signal strength meter built into the satellite receiver IRD. The installer adjusts the antenna position until the on-screen meter shows the signal strength and signal quality has been maximized.

Often satellite broadcasters rely on professional installers to properly install the systems at a customer site. Because the installers performance directly reflects the services of the broadcast provider, it is important to monitor and control the installation process. There is a need for a system and method to monitor and control the installation process.

SUMMARY OF THE INVENTION

The present invention is a system and method for allowing confirmation of a proper installation at a customer site. The present invention allows a satellite broadcast provider to confirm proper installation without relying on the installer or expecting the customer to assess the installation.

It is an object of the present invention to provide an improved system and method for installing a satellite receiver antenna. It is another object of the present invention to closely monitor and control the installation of the satellite receiver antenna that is installed by a professional installer contracted by the satellite broadcast provider. It is still another object of the present invention to utilize the feedback provided by the present invention in troubleshooting and payment to the installer.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 1 is a figure of a typical direct broadcast satellite system and antenna system at a customer site;

FIG. 2 is a flowchart of the method of the present invention; and

FIG. 3 is a block diagram of the communication between the installed system and the satellite broadcast provider.

DETAILED DESCRIPTION OF PREFERRED EMBODIMENTS

The present invention is described herein with reference to a geosynchronous direct broadcast satellite system 10 shown in FIG. 1. The system 10 includes a ground-based broadcast transmitter 12, a satellite system 14 having at least one satellite and a ground-based customer site 16. The customer site 16 has a dish antenna 18 and a receiver/decoder box, or IRD 20, located within the home and connected to a television 22.

The broadcast transmitter 12 receives digitally modulated television and/or audio signals and beams them to satellite 14. The satellite 14 translates the signals and beams them to the dish antenna 18 located at the customer site 16. The receiver 20 demodulates the signals for viewing on the television 22.

The installation process includes fixing the dish antenna 18 to a rigid stable surface. The installer then moves the antenna 18 until the IRD 20 measures a received signal strength that exceeds a predetermined value. The signal strength value is stored in the IRD 20 for communication to the broadcast provider. If the antenna is intended to receive signals from multiple satellite locations, the installer must refine the position of the antenna to achieve the necessary signal strength for all satellite locations.

According to the present invention, the IRD 20 assesses signal strength measurements, and other signals that are available to the IRD and makes a determination of the signal quality and detects from which satellite locations the IRD is actually receiving signals. Referring now to FIG. 2 there is shown a flowchart of the method 100 of the present invention. The IRD assesses 102 signal strength measurements along with the existence of L-band signals. In the installation, the IRD cycles through a plurality of potential configurations to determine the optimum antenna configuration. These signals are stored in the IRD and used in the assessment process. The measurements may need to be averaged over a period of time to account for any transient interference such as rain-fade.

The collected information is reported 104 to a data processing facility at the broadcast provider, where it is compared 106. The comparison 106 of the installation configuration and the communicated signal strength is against an expected configuration and expected signal strength. The comparison may also be made to the signal strength and installation configuration reported by the installer or customer at the time of the installation. In addition, the comparison 106 may be made using a combination of the reported and expected data. It is possible that the reported data comes directly from the IRD 20 or from the installer. The collected and compared information allows the broadcast provider to make a determination 108 that the installation was done properly and the installation configuration is correct.

In a further embodiment of the present invention, the determination 108 by the broadcast provider may be used to determine payment for the installation to the installer who provided the service or in trouble shooting processes. This allows the broadcast provider to closely monitor and control the installation process thereby ensuring quality services to their customers.

FIG. 3 shows the communication process 50 between the data processing facility and the IRD 20 at the customer site. This communication may occur at the time of installation, at a specified frequency, e.g., weekly or monthly, or upon request by the Direct Broadcast Satellite (DBS) provider. The request may be by way of instructions received by satellite, or coincident with communications by telephone with a customer service agent. The request may also be made by the customer, installer, or technician. Typically this information is conveyed by telephone, but other communication paths may be used, such as satellite, cable, digital subscriber line, and terrestrial wireless.

The expected configuration information may be a set value that is a current expected configuration, or it may be developed by averaging the installation configuration information provided over time by the IRD or the data processing facility. It may also be developed through historical trending of collected data. The historical data may be provided by either the IRD or the data processing facility. Likewise, the expected signal strength data may be a current value, or developed by averaging the signal strength information over time by the IRD or the data processing facility, or it may be historical trending as well. And, as with the configuration information, the historical trending of the communicated signal strength data may be provided by either the IRD or the data processing facility.

The present invention may also be used in diagnostic applications. The IRD may report signal strength, or installation configuration information over time. A comparison is made with the expected information, as described above. The expected information may be the values initially reported at the time of installation, or it may be the current, averaged, and historical trend data described above. In any event, changes between the currently reported data and the expected data allow an installer, technician, or customer to troubleshoot problems with the alignment of the antenna, the antenna itself, or its related components.

The invention covers all alternatives, modifications, and equivalents, as may be included within the spirit and scope of the appended claims.

What is claimed is:

1. A method of confirming alignment of an antenna with at least one satellite, comprising:
    securing an antenna on a mounting surface;
    distributing signals from the antenna to a receiver/decoder medium;
    physically moving the antenna without removing the antenna from the mounting surface until an indicator signals that the antenna is aligned with the at least one satellite by a measured signal strength;
    storing the measured signal strength on the receiver/decoder medium;
    communicating the measured signal strength measured at the receiver/decoder medium to a data processing facility at a broadcast provider via a communications link other than the satellite when the alignment is performed; and
    using the communicated signal strength to confirm proper alignment of the antenna with the at least one satellite by comparing, at the data processing facility, the measured signal strength with an expected calculated signal strength at the location of the antenna, wherein the expected calculated signal strength is calculated through averaging signal strength information over time and historical trending of the signal strength information, the expected calculated signal strength being stored at the broadcast provider.

2. The method as claimed in claim 1, further comprising:
    providing data from the receiver/decoder medium input by a customer site to the data processing facility;
    providing data from an installer to the data processing facility; and
    wherein said step of using the communicated signal strength further comprises using the data provided by the customer and the installer to confirm proper alignment of the antenna with the at least one satellite.

3. The method of claim 2 further comprising:
    issuing payment to the installer upon confirmation of proper alignment of the antenna with the at least one satellite.

4. The method of claim 2 further comprising using the data provided by the customer, data provided by the installer, or the communicated signal strength to troubleshoot problems with the antenna.

5. The method of claim 1 wherein said step of using the communicated signal strength further comprises:
    comparing the communicated signal strength with an expected calculated signal strength;
    diagnosing failures between the antenna and the receiver/decoder medium.

6. A method of confirming an installation configuration, including for reception of signals from at least one satellite, comprising:
    securing an antenna to a mounting surface;
    distributing signals from the antenna to a receiver/decoder medium;
    physically moving the antenna without removing the antenna from the mounting surface until an indicator signals the antenna is aligned with the at least one satellite by measuring a signal strength received at the antenna;
    storing an installation configuration on the receiver/decoder medium upon signal from the indicator, the installation configuration including at least the measured signal strength;
    communicating the installation configuration from the receiver/decoder medium to a data processing facility at a broadcast provider via a communications link other than the satellite when the installation configuration is installed; and
    using the communication installation configuration to confirm proper antenna installation, wherein an expected calculated signal strength at the location of the antenna is calculated through averaging signal strength information over time and historical trending of the signal strength information, the expected calculated signal strength being stored at the broadcast provider and compared at the data processing facility to the measured signal strength received at the antenna.

7. The method of claim 6 further comprising:
    providing data from an installer to the data processing facility; and
    wherein the step of using the communicated installation configuration further comprises using the data provided by the customer and the installer to confirm proper installation configuration and alignment of the antenna with the at least one satellite.

8. The method of claim 7 further comprising issuing payment to the installer upon confirmation of proper installation configuration and proper alignment of the antenna with the at least one satellite.

9. The method of claim 6 further comprising using data provided by the customer, data provided by the installer, the communicated signal strength, and the installation configuration to troubleshoot installation problems.

10. The method of claim 6 further comprising diagnosing failures within the receiver/decoder medium, antenna, or other distribution components.

11. The method of claim 10 wherein said step of diagnosing failures further comprises:
comparing a communicated signal strength with an expected signal strength; and
comparing the installation configuration with an expected installation configuration.

12. The method of claim 11 wherein comparing a communicated signal strength with an expected signal strength further comprises developing an expected signal strength by averaging the communicated signal strength over time.

13. The method of claim 11 wherein comparing a communicated signal strength with an expected signal strength further comprises developing an expected signal strength by using historical trending of communicated signal strength by the data processing facility.

14. The method of claim 10 wherein diagnosing failures further comprises:
comparing a communicated signal strength with a signal strength reported at the time of installation; and
comparing an installation configuration with an installation configuration reported at the time of installation.

15. The method of claim 14 wherein comparing a communicated signal strength with a signal strength reported at the time of installation further comprises the reporting the signal strength at the time of installation by the installer.

16. The method of claim 14 wherein comparing a communicated signal strength with a signal strength reported at the time of installation further comprises reporting the signal strength at the time of installation by the receiver/decoder medium.

17. The method of claim 10 wherein comparing the installation configuration with an installation configuration reported at the time of installation further comprises reporting the installation configuration by the installer.

18. The method of claim 10 wherein comparing the installation configuration with an installation configuration reported at the time of installation further comprises reporting the installation configuration by the receiver/decoder medium.

* * * * *